(12) United States Patent
Chatterjee et al.

(10) Patent No.: US 7,437,736 B2
(45) Date of Patent: Oct. 14, 2008

(54) METHOD AND APPARATUS FOR MANAGING WORKFLOW IN A SINGLE SIGN-ON FRAMEWORK

(75) Inventors: Surajit Chatterjee, South Riding, VA (US); Brian Keith Mizelle, Ashburn, VA (US); Ravi Puduchery Raghavasimhan, Reston, VA (US); Michael Fishman, Ashburn, VA (US)

(73) Assignee: Citibank, N.A., New York, NY (US)

( * ) Notice: Subject to any disclaimer, the term of this patent is extended or adjusted under 35 U.S.C. 154(b) by 719 days.

(21) Appl. No.: 10/797,177

(22) Filed: Mar. 10, 2004

(65) Prior Publication Data

US 2005/0204362 A1  Sep. 15, 2005

(51) Int. Cl.
G06F 3/00 (2006.01)
G06F 9/44 (2006.01)
G06F 9/46 (2006.01)
G06F 13/00 (2006.01)

(52) U.S. Cl. .................................. 719/320; 717/106
(58) Field of Classification Search ......... 719/310–320, 719/328–332; 717/101–123
See application file for complete search history.

(56) References Cited

U.S. PATENT DOCUMENTS

| | | | |
|---|---|---|---|
| 5,884,312 A | 3/1999 | Dustan et al. | 707/10 |
| 5,944,824 A | 8/1999 | He | 713/201 |
| 6,275,944 B1 | 8/2001 | Kao et al. | 713/202 |
| 6,345,386 B1 | 2/2002 | Delo et al. | 717/11 |
| 6,453,353 B1 | 9/2002 | Win et al. | |
| 6,625,649 B1 | 9/2003 | D'Souza et al. | 709/225 |
| 6,691,232 B1 | 2/2004 | Wood et al. | |
| 7,150,015 B2* | 12/2006 | Pace et al. | 717/176 |
| 2002/0138728 A1 | 9/2002 | Parfenov et al. | |
| 2002/0184405 A1* | 12/2002 | Omori et al. | 709/318 |
| 2002/0188869 A1 | 12/2002 | Patrick | |
| 2003/0037173 A1* | 2/2003 | Pace et al. | 709/310 |
| 2003/0101223 A1* | 5/2003 | Pace et al. | 709/206 |
| 2005/0015772 A1* | 1/2005 | Saare et al. | 719/310 |

FOREIGN PATENT DOCUMENTS

EP  1 014 249 A  6/2000

OTHER PUBLICATIONS

European Search Report dated Jul. 27, 2005 (5 pages).
Novell; Novell Secure Login: Novell Nsure Secure Identity Management; Technical White Paper; 2003; Novell, Inc.; 13 pgs.
"Safeguarding Financial Privacy: Single Sign-On—One Step in Assuring Service Providers Protect Your Curtomers' Personal Financial Data"; 2003 Passlogix, Inc.; 7 pgs.
"Enterprise Single Sign-on and HIPAA: A Best Practice in the "Good Faith Effort" to Proect Patents' Privacy"; 2003 Passlogix, Inc., 6 pages.

(Continued)

*Primary Examiner*—Meng-Ai An
*Assistant Examiner*—Diem K Cao
(74) *Attorney, Agent, or Firm*—George T. Marcou; King & Spalding LLP

(57) ABSTRACT

A method for managing workflow for an application, including obtaining an application adapter associated with the application, wherein the application adapter specifies a sub-task, monitoring the application to obtain a state, and performing an action associated with the sub-task, if the state is associated with the sub-task.

26 Claims, 4 Drawing Sheets

OTHER PUBLICATIONS

"Enterprise Single Sign-On: Balancing Security and Productivity"; BioNetrix Unified Identity Management for Enterprise and Internet Security; BioNetrix Corporation; 33 pgs.

D. Apelt; White Paper; "Single Sign-On: An Overview to Integration"; Protocom Development Systems Network Security and Innovation; May 19, 2003; 43 pgs.

* cited by examiner

METHOD AND APPARATUS FOR MANAGING WORKFLOW IN A SINGLE SIGN-ON FRAMEWORK

BACKGROUND

Password management has become a complex and unmanageable task for end users of systems (i.e., computers running several applications). In this security-conscious age of technology, the complexity of password management typically results in compromised security and lost productivity. Therefore, the focus of system login has shifted toward coordinating and integrating user authentication and sign-on functions for the multitude of different applications within a system.

One such tool that provides coordination and integration is known as single sign-on (SSO). SSO is a user authentication process that permits a user to enter one name and password in order to access multiple applications within a system. SSO, which is typically requested at the initiation of a network session, allows accessibility to all authorized applications (i.e., where the user has the proper access rights) upon authentication of the user. In doing so, SSO eliminates future authentication prompts when the user switches applications during a particular network session. Thus, SSO enables the user to provide a single set of authentication credentials that, if valid, establish a relationship that gives the user access to all authorized system resources.

More specifically, the user initiates an SSO logon session via a user agent (i.e., desktop browser, mobile device, etc.). When the user's authentication information is verified, SSO generates a master token to represent the user's authenticated session. The master token includes a unique ID by which the master token may be identified by the system. In addition, the master token is capable of keeping track of the various applications upon which the user requests access within the system. Typically, the master token refers to session information, such as the user ID of the user, for the length of time that a user is actively connected to the system (i.e., the session length), etc. Conventionally, the master token is passed to multiple applications participating in the SSO session to avoid the need for user authentication for each application.

SSO offers user convenience, but more importantly, increased security because SSO limits the number of times a user must enter sensitive information (i.e., password, user ID, credit card number, social security number, etc.) to gain access to multiple applications on the system. Additionally, the activity to verify the user's information for each requested application is transparent to the user. In other words, the user does not need to know how each application receives and checks authentication information before granting access to the user.

SUMMARY

In general, in one aspect, the invention relates to a method for managing workflow for an application, comprising obtaining an application adapter associated with the application, wherein the application adapter specifies a sub-task, monitoring the application to obtain a state, and performing an action associated with the sub-task, if the state is associated with the sub-task.

In general, in one aspect, the invention relates to a system for managing workflow for an application, comprising an application, wherein the application comprises a state, an application adapter configured to define an action associated with the state, and an application adapter runtime configured to monitor the application and perform the action when the state is encountered.

Other aspects of the invention will be apparent from the following description and the appended claims.

DETAILED DESCRIPTION

Figure 1:
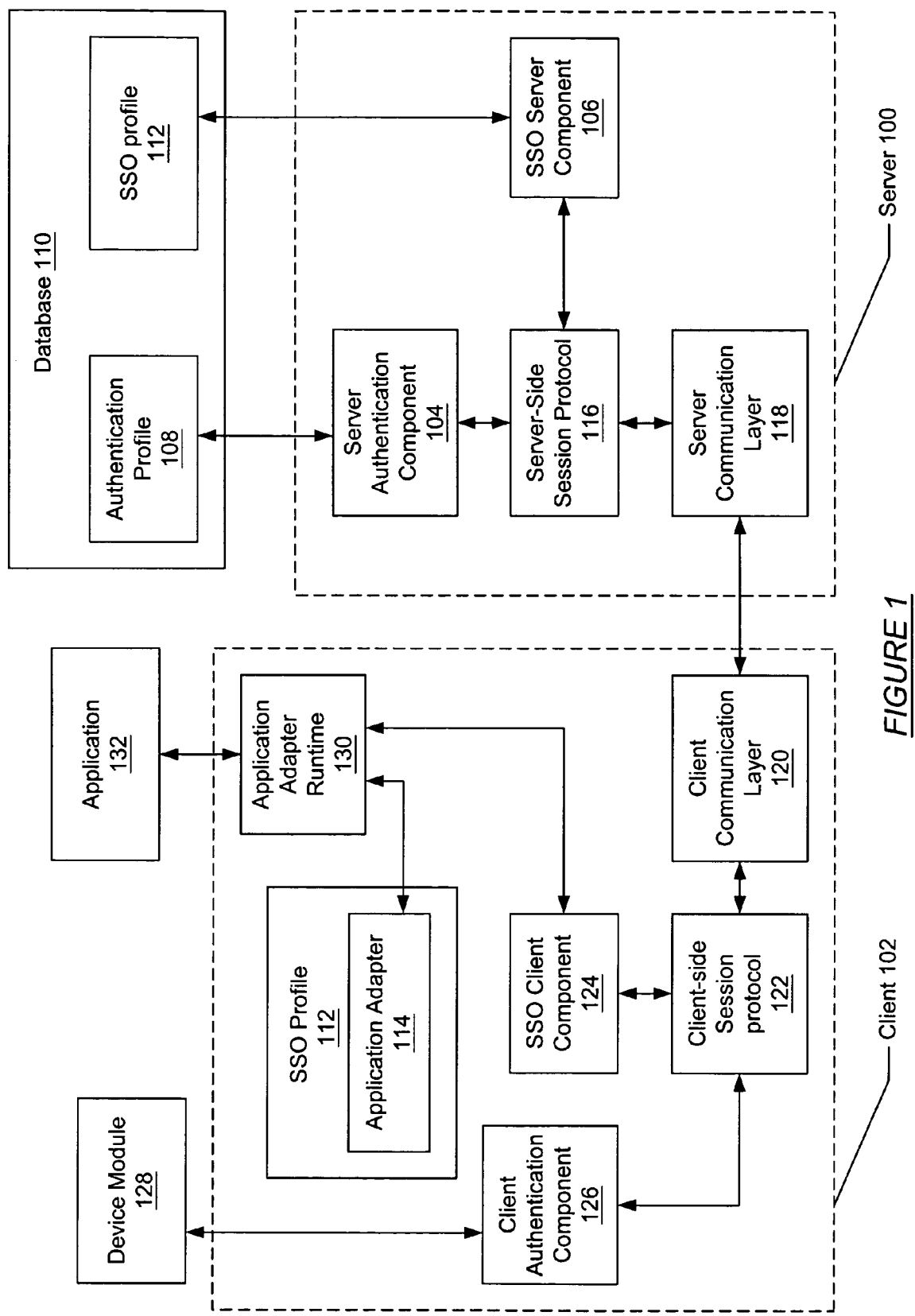
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, one or more embodiments of the invention relate to a method and apparatus for managing workflow in an SSO environment. More specifically, embodiments of the invention enable a user to manage workflow by monitoring the various states of an application executing in the SSO environment and performing various actions when the states are encountered.

FIG. 1 shows a system for managing workflow in an SSO environment in accordance with one embodiment of the invention. Specifically, the system includes a server (100) and one or more clients (102). In one embodiment of the invention, the server (100) includes a server authentication component (104) and an SSO server component (106). The server authentication component (104) includes functionality to authenticate a user interacting with the client (102). More specifically, in one embodiment of the invention, the server authentication component (104) includes functionality to retrieve an authentication profile (108) from a database (110). The authentication profile (108) includes the information necessary to authenticate the user. The server authentication component (104) uses the authentication profile (108) to guide the authentication of the user (i.e., indicates the method of authentication such as biometrics (e.g., print reader, voice, retina scan) password from smart card, etc., and includes a copy of the authentication information used to verify the user, etc.)

In one embodiment of the invention, the server authentication component (104) retrieves information to authenticate the user via a client authentication component (126). The client authentication component (126) typically includes functionality to prompt the user for authentication information and interface with a device module (128) (i.e., the hardware required to input the authentication information, e.g., a finger print reader, etc.).

Continuing with the discussion of FIG. 1, the SSO server component (106) includes functionality to provide the client (102) with the necessary information to allow the client (102) to perform the workflow management. Specifically, once the user has been successfully authenticated by the server authentication component (104), the SSO server component (106) proceeds to retrieve the corresponding SSO profile (112) from the database (110). In one embodiment of the invention, the SSO profile (112) includes one or more application adapters (114). In one embodiment of the invention, the application adapters include the necessary information to enable workflow management.

In one embodiment of the invention, the application adapter (114) includes two portions: an initialization portion and a script portion (not shown). In one embodiment of the invention, the initialization portion includes information that determines how the application (for which the application adapter (14) is associated) is to be launched. This information may include, but is not limited to, an application type (e.g., a windows application, a web-based application, a terminal emulator application, etc.), an adapter name, an application executable name, an application executable path, a working directory for application launch, command line options for the application, information about how to launch the application when recording states within the application, and a location of an associated script file (i.e., the script portion). In one embodiment of the invention, the script portion of the application adapter (114) may include information that indicates how the application adapter (114) interacts with the application (132) at runtime, e.g., information about what action to perform during a particular application state.

Continuing with the discussion of FIG. 1, the server (100) also includes a server-side session protocol (116) and a server communication layer (118). The server-side session protocol (116) is used to manage the session protocol for the various sessions (i.e., authentication sessions and SSO sessions). The server communication layer (118) includes functionality to manage communication between the server (100) and the client (102). More specifically, the server communications layer (118) includes functionality to send information to and receive information from a client communication layer (120) residing on the client (102).

In one embodiment of the invention, the client (102) includes the client communication layer (120), a client-side session protocol (122), an SSO client component (124), the client authentication component (126), and an application adapter runtime (130). Similar to the server-side session protocol (116), the client-side session protocol (122) manages sessions on the client (102). Further, the SSO client component (124) includes functionality to enable workflow management. Specifically, in one embodiment of the invention, once the user has been authenticated the SSO client component (124) requests the SSO server component (106) to forward the SSO profile (112) to the client (102). In addition, the SSO client component (124) includes the necessary functionality to initiate the application adapter runtime (130).

In one embodiment of the invention, the application adapter runtime (130) includes functionality to interpret the information in the application adapter (114), i.e., the information in the initialization portion and the information in the script portion. Further, the application adapter runtime (130) includes functionality to monitor the state of the application (132) and perform any action associated with the state.

Those skilled in the art will appreciate that while the above discussion described a user having two profiles (i.e., an authentication profile (108) and a SSO profile (112)) these profiles may be combined into one file and be referred to as a profile.

Figure 2:
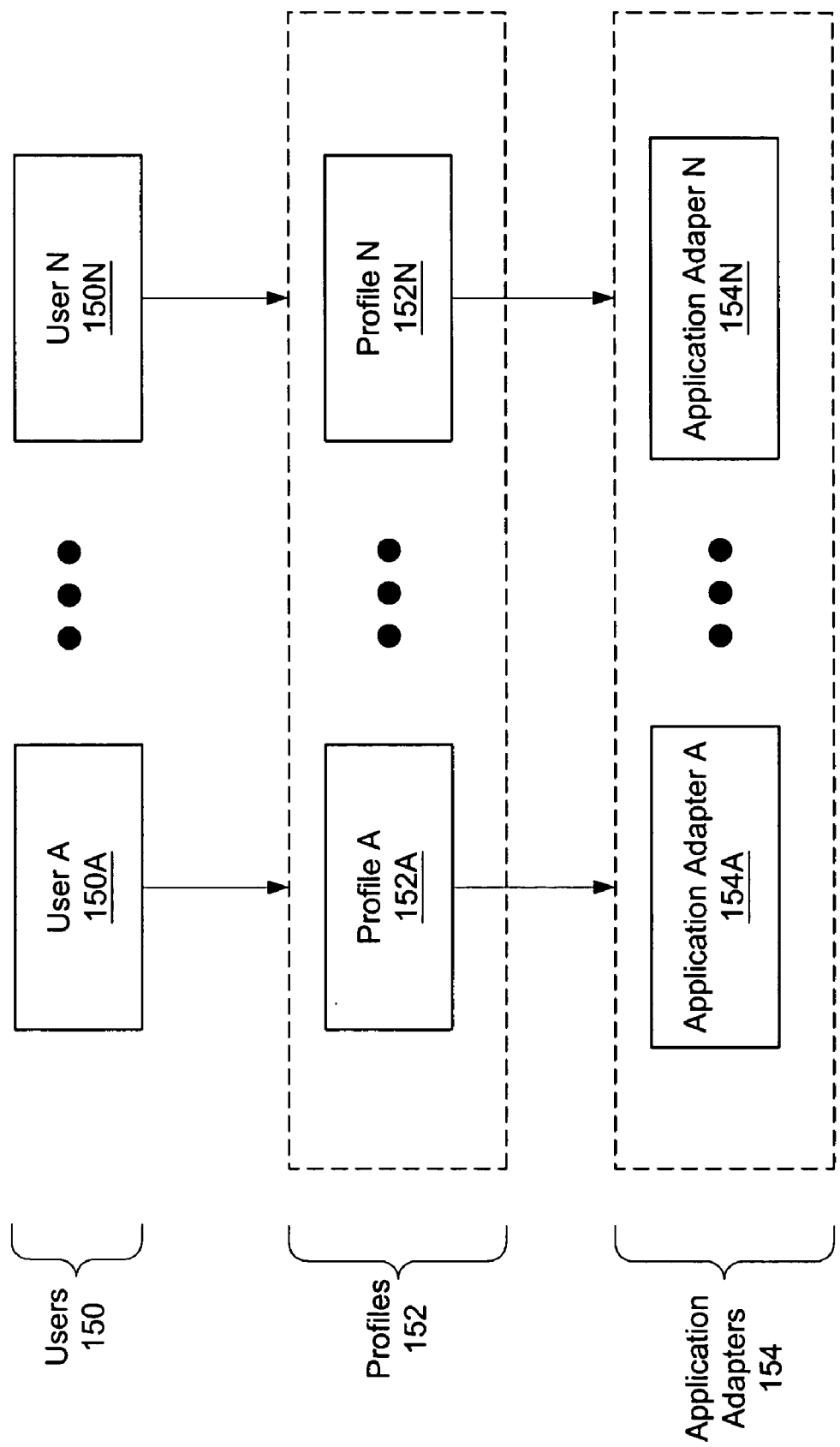
FIG. 2 shows a data structure hierarchy in accordance with one embodiment of the invention.

FIG. 2 shows a data structure hierarchy in accordance with one embodiment of the invention. Specifically, FIG. 2 shows the relationship between users (150), profiles (152), and application adapters (154). In one embodiment of the invention, one or more users (i.e., user A (150A), user N (150N)) may be associated with a single profile (i.e., profile A (152A), profile N (152N)). Further, the profiles (152) may be associated with one or more application adapters (application adapter A (154A), application adapter N (154N)). Using the aforementioned hierarchy, a single application adapter (154) may be used by multiple users, thereby promoting code reusability.

Those skilled in the art will appreciate that a user (150) may correspond to a group of users that access the system using a common user name and authentication information.

Figure 3:
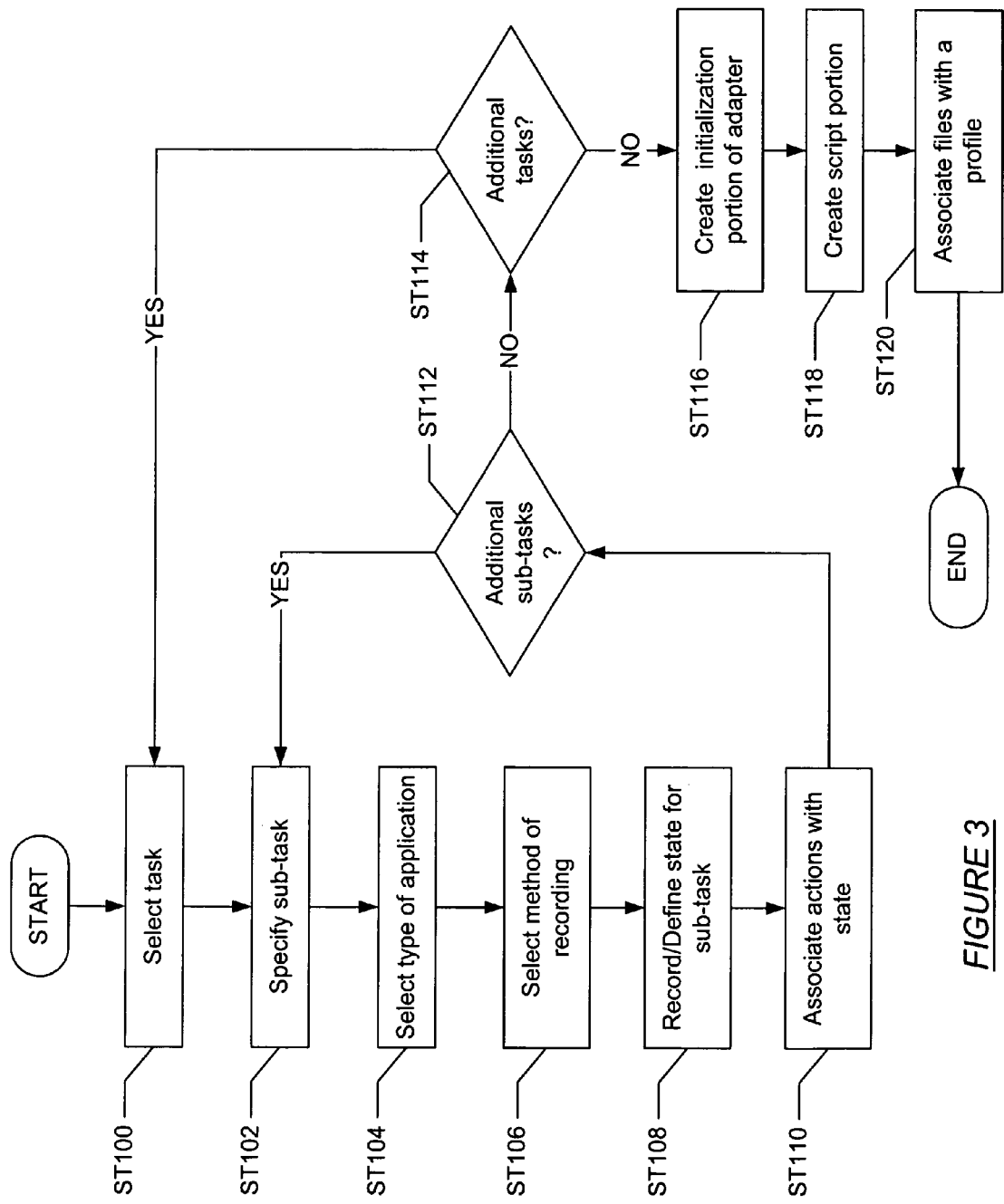
FIGS. 3 and 4 shows flowcharts in accordance with one embodiment of the invention.

FIG. 3 shows a flowchart in accordance with one embodiment of the invention. More specifically, FIG. 3 shows a method for generating an application adapter for an application in accordance with one embodiment of the invention. Initially, the type of task is selected (Step 100). In one embodiment of the invention, the task may correspond to a pre-login task, a login task, a post-login task, a logout task, and a pre-terminate task. The aforementioned task designations are typically used as a means to organize the workflow of the application.

Continuing with the discussion of FIG. 3, once the task has been selected, a sub-task may then be specified (Step 102). In one embodiment of the invention, the sub-task corresponds to a functional portion of the task. Specifically, the sub-task defines the pre-state of the application that must be satisfied prior to executing the action, the action to execute, and the post-state of the application that indicates successful completion of the action. Next, the application type is selected (Step 104). As noted above, the application type may indicate whether the application is a windows application, a web-based application, a terminal emulator application, etc. The information about the application type is typically used to determine how to capture the various states of the application. In one embodiment of the invention, the state of the application is defined by the collection of text, window title, parent and child windows, and control Ids, enumeration order of windows within the application, window class (i.e., an artificial attribute that is assigned to the window when it is created).

The method of recording the states is subsequently selected (Step 106). In one embodiment of the invention, an auto-state configuration mechanism is used to capture the state of the application. In another embodiment of the invention, a manual-state configuration mechanism is used to capture the state of the application. Once the aforementioned information has been specified, the state corresponding to the sub-task is recorded (if using an auto-state configuration mechanism), or defined if using a manual state configuration mechanism (Step 108). Regardless of the mechanism used to capture the state, once the state has been recorded/defined, one or more actions may then be associated with the state (Step 110). For example, the actions may include prompting the user for data, retrieving particular data, automatically navigating the user to a particular portion of the application, etc.

Once the action(s) have been associated with the state, a determination is made whether there are additional sub-tasks to be specified (Step 112). If additional sub-tasks are required, then Steps 102-112 are repeated until no more sub-tasks for the particular task are remaining to be specified. Once all the sub-tasks for the particular task have been specified, a determination is made any additional tasks are selected (Step 114). If additional tasks are selected, then Steps 100-114 are repeated until no more tasks remain to be selected.

Once all the tasks have been selected and their sub-tasks defined, the information gathered during the aforementioned steps is used to generate the initialization portion of the application adapter (Step 116) and the script portion of the application adapter (Step 118). In one embodiment of the invention, the initialization portion sets the application adapter to the primary executable, i.e., the first portion of code that is executed when the application associated with the application adapter is launched.

In one embodiment of the invention, the script portion of the application adapter is expressed in extensible mark-up language (XML). Alternatively, the script portion of the application adapter may be described in proprietary binary format. The resulting application adapter is subsequently associated with one or more profiles (Step 120). Those skilled in the art will appreciate that each application adapter may include one or more tasks, and that each task may include one or more subtasks.

In one embodiment of the invention, one or more parameters may be defined while recording the sub-tasks. These parameters may include identity, passwords, domains, etc., associated with the particular application. Further, control actions such as clicking a button and the selection of a drop down list menu may also be defined while recording the sub-tasks. In addition, dynamic variables may be added by the user to a particular sub-task. The dynamic variables may be obtained from a local data repository or through an external system. In one embodiment of the invention, the value of the dynamic variables would be determined when the action within the sub-task is executed. Thus, the value of the dynamic variables allows the application adapter to perform various actions based on the context of the application (i.e., the value of the new variables).

Figure 4:
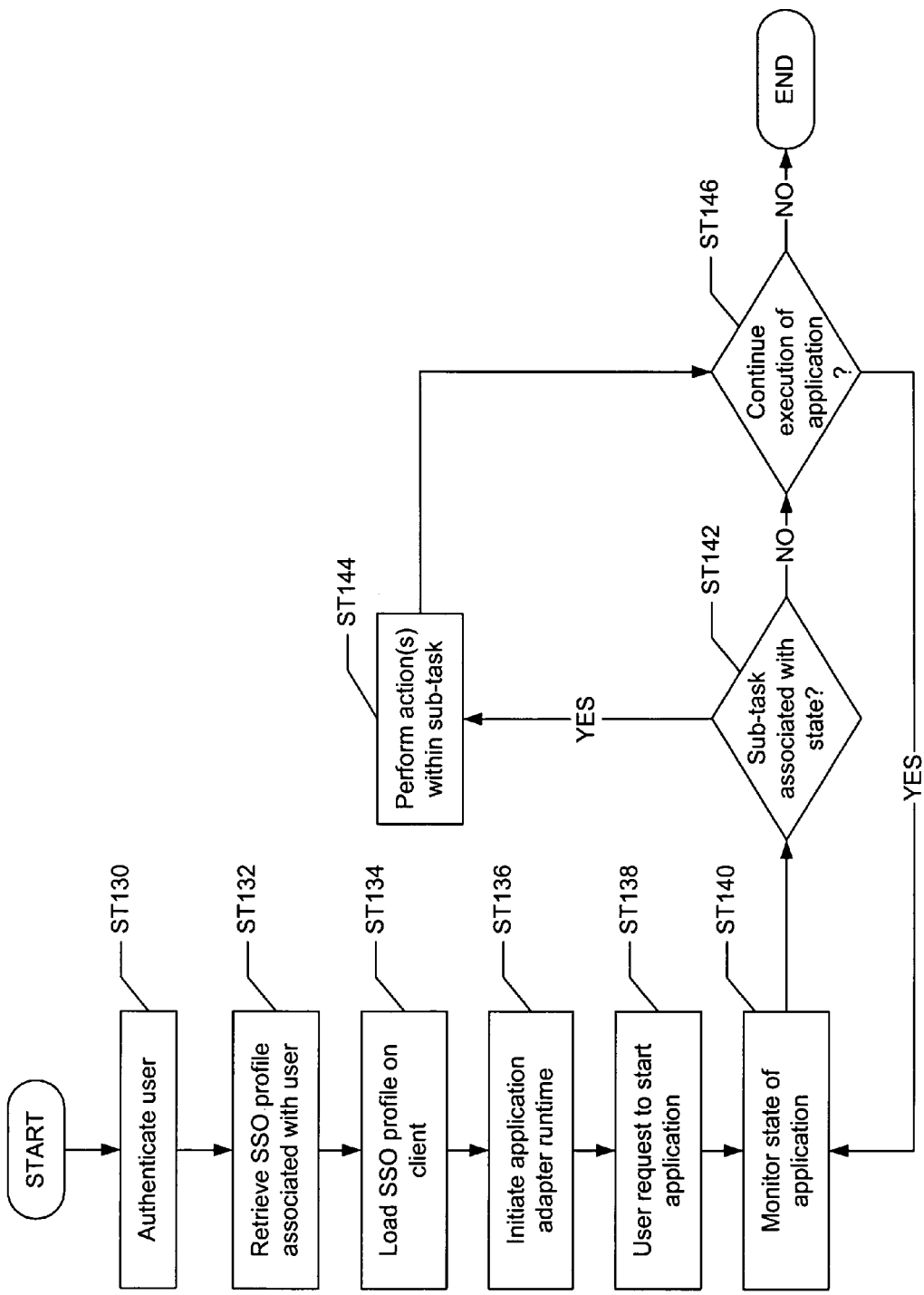

FIG. 4 shows a method for using an application adapter in accordance with one embodiment of the invention. Initially, a user is authenticated (Step 130). In one embodiment of the invention, the user is authenticated using the authentication infrastructure described in FIG. 1. Once the user has been authenticated, the SSO profile (including one or more application adapters) associated with the user is retrieved (Step 132) and loaded on the client (Step 134), which the user is using. The application adapter runtime is subsequently initiated (Step 136). At this stage, the system performing the aforementioned steps is ready to use the application adapter (s) within the SSO profile.

A user subsequently requests that a particular application is started (Step 138). The request is intercepted by the application adapter runtime, which uses the initialization portion of the application adapter associated with the application to start the application and also to initiate monitoring of the various states of the application (Step 140). As the application moves through various states, the application adapter runtime monitors the states and determine whether there is a sub-task associated with the state (Step 142).

If a sub-task is associated with the state, then the application adapter executes the action specified within the sub-task (Step 144). In one embodiment of the invention, the application adapter runtime includes functionality to perform the action. Further, the application adapter runtime, prior to executing the action, may first verify the state of the application (i.e., the pre-state) against the pre-state defined in the sub-task. If the pre-state of the application matches the pre-state defined the sub-task, then the application adapter proceeds to execute the action.

Upon completion of the action, the application adapter runtime may verify the state of the application (i.e., the post-state) to determine whether the action was successfully executed. If the application was successfully executed (as indicated by the post-state), then the application adapter runtime allows the application to continue execution (Step 146). Steps 140-146 may be repeated until the application is terminated.

As noted above, each task may include multiple sub-tasks. In one embodiment of the invention, the user, via an toolbar client or a custom interface client, may specify that only one sub-task within each task may be executed by the application adapter runtime. Alternatively, the user, via a toolbar client or a custom interface client, may specify that the application adapter runtime execute more than one sub-task specified within the task.

The following example is used to describe an embodiment of the invention and is not intended to limit the scope of the application. Consider the following scenario for a Customer Relationship Banking Application (CRBA). The scenario includes the following features: (1) the CRBA is launched over a network-mapped drive; (2) the application launcher prompts the user to type in an employee identification number (allowing the application launcher to launch the appropriate version of the CRBA to launch); (3) after the CRBA is launched the user to logs into the application; and (4) once the user logs into the CRBA, the user navigates directly to different areas of the CRBA, such as the checking account area, the savings account area, the money market account area, etc.

For the purposes of the example, the login may include three cases. The first case is a successful login where the user is prompted for a user-id and password. The user provides a user ID and password that is accepted by the CRBA and the user obtains access to the application. The second case is a failure login where the user is unable to login due to a wrong password/user ID combination. The third case is a change password event case in which the user has the correct password, but the password is not accepted because it is outdated. In this case, the CRBA prompts the user for a new password.

The following is a description of the application adapter that may be used within the aforementioned scenario. The application adapter may include a prelogin task and a login task. In the prelogin task, the user ID is configured as an external parameter. The pre-state for the prelogin task is configured to recognize the prompt for the user ID. When the prompt is encountered, the user ID corresponding to the particular user is supplied to the application, via the application adapter runtime. Once the user ID is provided, the post-state is configured to recognize that the user ID has been entered.

The login task includes sub-tasks to address each of the aforementioned login cases. The login sub-task includes a pre-state that corresponds to prompt login information. The login sub-task also includes an action that defines how to login into the CRBA. Specifically, the login action may include a script to retrieve the user's password for a repository and present the password to the CRBA. The login sub-task also includes post-state for verifying that the login information was sent to the application. A subsequent success subtask may be defined that verifies that the login was successful. This sub-task may only define a pre-state that reflects that login was successful and not include any actions.

In the case where the user ID is correct but the password is incorrect, the application adapter uses the same sub-task used to performing the login but an additional sub-task is defined to handle the resulting failed login. Specifically, a failure login subtask is defined which detects the error message resulting from the failed login. The pre-state of failure login subtask corresponds to the application state (e.g., the pre-state detects the error message). The action defined within the subtask may prompt the user for the correct password and passes the correct password to the application. If successful (as verified by the successful subtask), then the user is logged into the application.

In the case where the user ID and password are correct but the password has expired, the same login subtask is used. However, instead of subsequently executing the success subtask, a change password subtask is triggered. The change password sub-task may include a pre-state of defined as a prompt from the CRBA to supply a new password. The action associated with the change password sub-task may include entering the new password. The post-state may include a prompt from the system indicating that the new password has been sent and accepted. In this particular case, if the new password is accepted by system, an SSO client component may update the password in the database via the SSO server component.

Once the user has successfully logged onto the CRBA, the user may be navigated directly to a specific area of the application. The navigation would typically be performed by sub-tasks defined with a postlogin task. In the above scenario, at least three sub-tasks may be defined, one covering each of the following areas: the savings account area, the checking account area, and the money market account area. The parameter for each of the sub-tasks may include account type and customer account number. The application adapter may execute any one of the three sub-tasks based on the information input by the user (i.e., customer account number and account type). The sub-tasks would then navigate the user to the particular area of the application as defined by the information input by the user. In one embodiment of the invention, the application adapter runtime may be configured to automatically retrieve the customer information (i.e., customer account number and account type) as opposed to requesting the user to enter the information.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for managing workflow for an application, comprising:
    authenticating a user;
    retrieving a profile associated with the user, if the user is authenticated,
    wherein the profile comprises an application adapter;
    wherein the profile is a single sign-on profile;
    said application adapter further comprises a pre-login task in which a user ID corresponding to the user is configured as an external parameter and a pre-state for which is configured to recognize a prompt for the user ID and, responsive to the prompt for the user ID, to supply the user ID to the application via an application adapter runtime;
    obtaining the application adapter associated with the application, wherein the application adapter specifies a sub-task;
    monitoring the application to obtain a state; and
    performing an action associated with the sub-task, if the state is associated with the sub-task.

2. The method of claim 1, further comprising:
    generating the application; and
    associating the application adapter with the profile.

3. The method of claim 2, wherein generating the application adapter comprises:
    selecting a task;
    specifying the sub-task associated with the task;
    specifying a means for recording the state associated with the sub-task;
    recording the state using the means for recording the state;
    specifying the action to perform when the state associated with the sub-task is encountered; and
    generating the application adapter using the state associated with the sub-task and the action.

4. The method of claim 3, wherein the application adapter comprises an initialization portion and a script portion.

5. The method of claim 4, wherein the script portion comprises the action.

6. The method of claim 3, wherein the means for recording the associated state comprises at least one selected from the group consisting of auto-state configuration mechanism and manual-state configuration mechanism.

7. The method of claim 1, wherein performing the action comprises passing a local parameter to the application.

8. The method of claim 1, wherein the sub-task is associated with a task.

9. The method of claim 8, wherein the task is at least one selected from the group consisting of a pre-login task, a login task, a post-login task, a logout task, and a pre-termination task.

10. The method of claim 1, wherein the sub-task comprises at least one selected from the group consisting of a pre-state setting, the action, and a post-state setting.

11. The method of claim 10, wherein the sub-task comprises a dynamic variable.

12. The method of claim 11, wherein the action comprises functionality to use the dynamic variable to navigate the user to a particular point in the application.

13. The method of claim 1, wherein the action comprises functionality to navigate the user to a particular point in the application.

14. The method of claim 1, wherein the application adapter is interpreted using an application adapter runtime.

15. A system for managing workflow for an application, comprising:
    a processor;
    an authentication infrastructure configured to authenticate a user and retrieve a profile associated with the user when the user is authenticated,
    wherein the profile comprises an application adapter;
    wherein the profile is an single sign-on profile; and
    said application adapter further comprises a pre-login task in which a user ID corresponding to the user is configured as an external parameter and a pre-state for which is configured to recognize a prompt for the user ID and, responsive to the prompt for the user ID, to supply the user ID to the application via said application adapter runtime;
    wherein the application comprises a state;
    an application adapter configured to define an action associated with the state; and
    an application adapter runtime configured to monitor the application and perform the action when the state is encountered.

16. The system of claim 15, further comprising:
    a database configured to store the profile.

17. The system of claim 15, wherein the action is associated with a sub-task.

18. The system of claim 17, wherein the sub-task comprises at least one selected from the group consisting of a pre-state and a post-state.

19. The system of claim 18, wherein the sub-task comprises a dynamic variable.

20. The system of claim 19, wherein the action is configured to use the dynamic variable to navigate the user to a particular point in the application.

21. The system of claim 15, wherein the sub-task is associated with a task.

22. The system of claim 21, wherein the task is at least one selected from the group consisting of a pre-login task, a login task, a post-login task, a logout task, and a pre-termination task.

23. The method of claim 15, wherein the action is configured to navigate the user to a particular point in the application.

24. The system of claim 15, wherein the application adapter comprises an initialization portion and a script portion.

25. The system of claim 24, wherein the script portion comprises the action.

26. The system of claim 15, wherein the state comprises at least one application selected from the group consisting of text, window title, parent and child windows, and control IDs.

* * * * *

UNITED STATES PATENT AND TRADEMARK OFFICE
CERTIFICATE OF CORRECTION

PATENT NO. : 7,437,736 B2  Page 1 of 1
APPLICATION NO. : 10/797177
DATED : October 14, 2008
INVENTOR(S) : Surajit Chatterjee et al.

It is certified that error appears in the above-identified patent and that said Letters Patent is hereby corrected as shown below:

IN THE REFERENCES CITED SECTION (56) - OTHER PUBLICATIONS -

On Page 2, Column 1, Line 3, please change "Security; BioNetrix Corporation; 33 pgs." to -- Security; 2002 BioNetrix Corporation; 33 pgs. --

IN THE CLAIMS SECTION -

In Column 7, Line 64, please change "generating the application; and" to -- generating the application adapter; and --

Signed and Sealed this

Thirtieth Day of December, 2008

JON W. DUDAS
*Director of the United States Patent and Trademark Office*